United States Patent [19]

Stephenson et al.

[11] 4,381,085
[45] Apr. 26, 1983

[54] SEAT BELT RETRACTOR WITH REDUCED SPOOLING

[75] Inventors: Robert L. Stephenson, Utica; John W. Frankila, Sterling Heights, both of Mich.

[73] Assignee: Allied Corporation, Morris Township, Morris County, N.J.

[21] Appl. No.: 251,614

[22] Filed: Apr. 6, 1981

[51] Int. Cl.³ .................... A62B 35/02; B65H 75/48
[52] U.S. Cl. .................... 242/107.3; 242/107.4 A
[58] Field of Search ....... 242/107.2, 107.4 R–107.4 E, 242/107.3; 280/801–808; 297/474–480

[56] References Cited

U.S. PATENT DOCUMENTS 3,817,473 6/1974 Board et al. ............... 242/107.2
4,168,810 9/1979 Sack et al. ................. 242/107.4 A
4,328,933 5/1982 Loose ........................ 242/107.2

Primary Examiner—John M. Jillions
Attorney, Agent, or Firm—Roger H. Criss; Robert H. Johnson

[57] ABSTRACT

A seat belt retractor including a web clamp in the retractor housing to reduce the spooling effect when the retractor is locked. The webbing extends from the retractor spool about a web clamp and then outwards of the retractor housing. Extraction forces acting on the webbing in an emergency result in forcing of the web clamp against the roll of webbing to thereby prevent further withdrawal of the webbing from the spool. The web clamp is maintained in close proximity to the roll of webbing regardless of the amount of webbing left on the spool.

6 Claims, 4 Drawing Figures

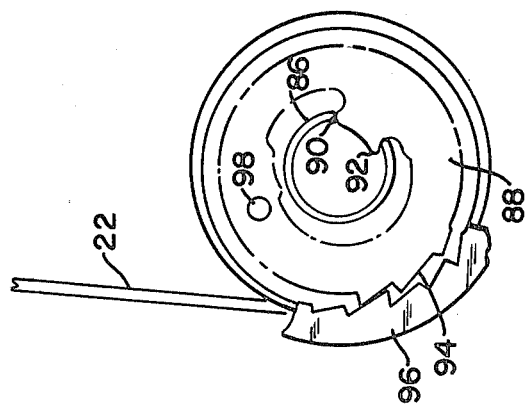
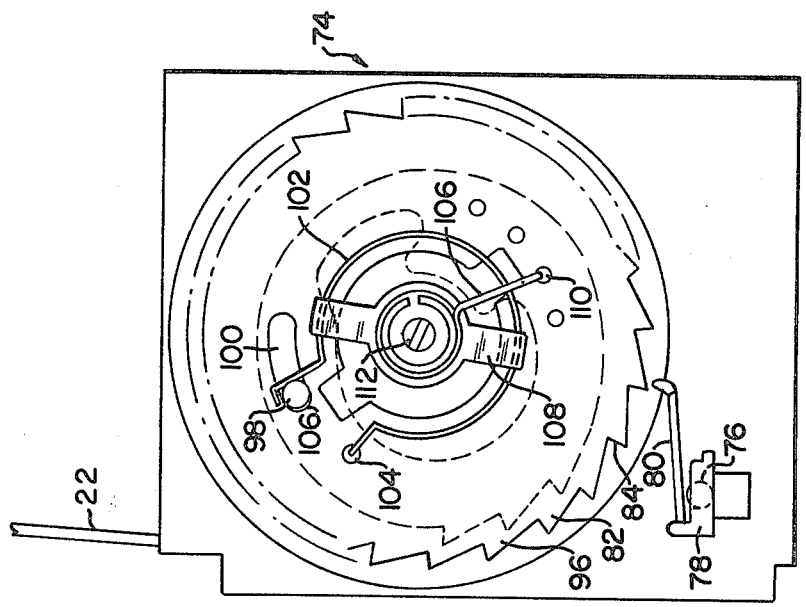

SEAT BELT RETRACTOR WITH REDUCED SPOOLING

BACKGROUND OF THE INVENTION

1. Field of the Invention

This invention relates to a seat belt retractor provided with a reduced spooling feature.

2. Description of the Prior Art

It has been suggested to provide a mechanism in a seat belt retractor to reduce additional payout of seat belt webbing from the retractor when the retractor is locked, due to the so-called spooling effect. This results from occupant induced forces on the webbing which cause tightening up of the convolutions of webbing on the retractor spool when locked and thereby make available additional amounts of webbing for further extraction prior to arresting further forward motion of the occupant. In commonly assigned copending U.S. patent application Ser. No. 091,641, filed Nov. 5, 1979 now U.S. Pat. No. 4,343,488 in the name of R. L. Stephenson, there is disclosed the use of web clamp which clamps against the roll of webbing on the spool to reduce the spooling effect in the event of an emergency. It would be desirable if a simplified version of a web clamp anti-spooling device were provided in a seat belt retractor.

SUMMARY OF THE INVENTION

In accordance with this invention, there is provided a seat belt retractor comprising:

a housing;

a spool rotatably mounted in the housing;

seat belt webbing wrapped about the spool in the form of a roll of webbing and adapted to be extended therefrom and retracted thereon;

locking means in the housing actuatable to prevent rotation of the spool; and clamp means movably disposed in the housing, the clamp means having at least one clamp surface adapted to contact the roll of webbing on the spool to limit withdrawal of the webbing from the spool, the clamp means being movable towards the roll of webbing, the webbing extending from the roll of webbing on the spool about the clamp means and then out of the housing, forces acting on the webbing when the locking means is actuated resulting in movement of the clamp means towards the roll of webbing whereby the clamp surface comes into contact with the roll of webbing.

The present invention thus makes use of the forces acting on the webbing due to occupant-induced loads which moves a clamp surface into engagement with the roll of webbing on the spool to prevent further payout of the webbing when the retractor is locked. The invention provides a simplified, compact and low-cost means of achieving this desirable result.

BRIEF DESCRIPTION OF THE DRAWINGS

FIG. 3 is a side view of the locking mechanism of the retractor of FIG. 1, with portions broken away.

FIG. 4 is an enlarged view of a portion of FIG. 3 when the retractor is locked.

DESCRIPTION OF THE PREFERRED EMBODIMENTS

Figure 1:
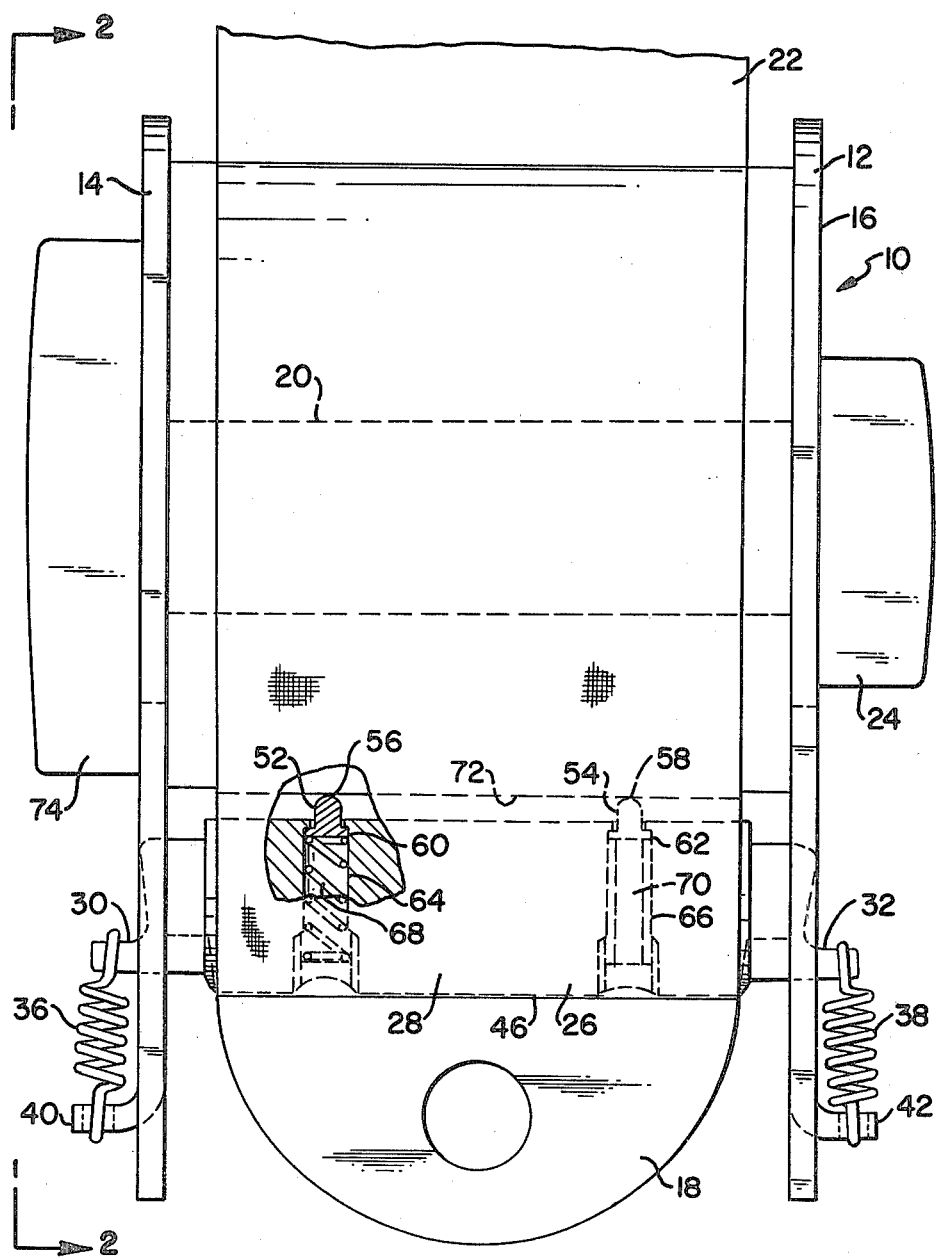
FIG. 1 is a plan view of the retractor of this invention.

With reference to the drawings, there is shown a retractor, generally indicated at 10, formed of a U-shaped frame 12 having upstanding side flanges 14, 16 and base 18. Spool 20 is rotatably supported on flanges 14, 16 and seat belt webbing 22 is wound thereabout in a normal fashion in a series of convoluted windings. Retractor 10 is adapted to be installed in a vehicle and webbing 22 is adapted to extend about an occupant in the vehicle with its opposite end typically being provided with a tongue portion of a buckle and tongue assembly. A rewind spring 24 normally urges spool 20 in a rewind direction (counterclockwise in FIG. 2) so that webbing 22 is biased towards spool 20.

In accordance with this invention, there is provided a web clamp 26 in the form of an elongated bar having a central portion 28 extending between side flanges 14, 16 and legs 30, 32 extending laterally through slots 34 formed in flanges 14, 16. Coil springs 36, 38 have one end attached to legs 30, 32 and their opposite ends attached to portions 40, 42 of frame 12 that extend outwardly from flanges 14, 16. Web clamp 26 is normally held in the position shown in FIGS. 1 and 2 due to the force of springs 36, 38 but is movable and guided in slots 34 as described hereinafter.

Figure 2:
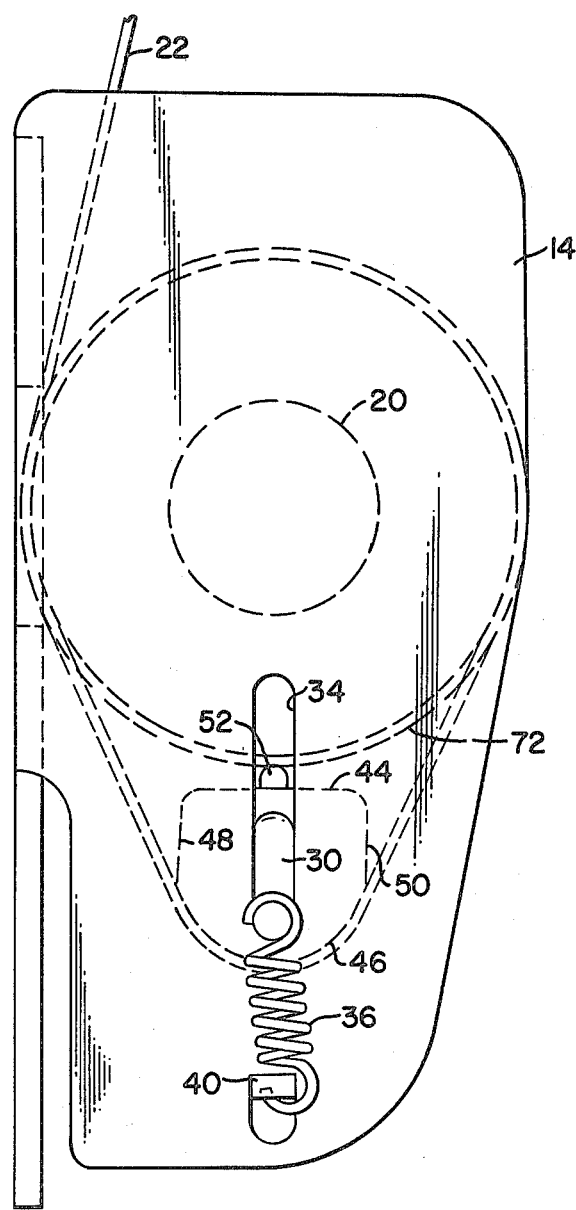
FIG. 2 is a side elevation view taken along line 2—2 of FIG. 1, with the locking means omitted for ease of understanding.

As particularly evident from FIG. 2, web clamp 26 has a generally planar surface 44 which faces spool 20 and sides 48, 50 which are joined by arcuate surface 46 opposite the surface 44. Surface 44 is a clamping surface adapted to engage webbing 22 to clamp the same; for this purpose, surface 44 may be provided with knurls or other roughened surface means.

Buttons 52, 54 are provided in the central portion 28 of clamp 26 and include tips 56, 58 and bases 60, 62. Buttons 52, 54 (preferably formed of plastic) are retained within bores 64, 66 in clamp 26. Springs 68, 70 are disposed within bores 64, 66 and bias buttons 52, 54 upwardly as viewed in FIGS. 1 and 2.

Webbing 22 is wrapped about spool 20 so as to provide a roll 72 of webbing on the spool. Tips 56, 58 of buttons 52, 54 are adapted to contact roll 72 of webbing on spool 20. Buttons 52, 54 serve to normally keep clamp surface 44 adjacent to but away from the roll of webbing 72. Webbing 22 extends from roll 72 and is trained about web clamp 26, being in contact with arcuate surface 46 and then exits frame 12.

As shown in FIGS. 3 and 4, retractor 10 includes locking means 74 to arrest outward movement of webbing 22 in the event of an emergency. Any suitable locking means may be employed, but it is preferred to have an outside locking means so as not to interfere with the action of web clamp 26. The locking means may be vehicle sensitive, web sensitive or both, as is known in the art. The presently preferred locking means as depicted is that shown in U.S. Pat. No. 4,168,810, the disclosure of which is expressly incorporated herein by reference. The preferred locking means includes a ball sensor 76 supported in support 78. Pawl 80 mounted on support 78 is adapted to be lifted in response to motion of the ball 76 upon a deceleration of the vehicle. Flywheel 82 is rotatably supported on the end of tube 86 (about which spool 20 is fixed) and has peripheral ratchet teeth 84 adapted to be engaged by the lifted pawl 80. Tube 86 has a C-shaped cross-section (FIG. 4) defining a slot which receives cam surfaces 90, 92 of lock dog 88. Lock dog 88 has peripheral ratchet teeth 94 which are adapted to engage with the ratchet teeth of a fixed lock ring 96 to lock the retractor against rotary motion. Post 98 extends axially from lock dog 88 and is received in curved slot 100 in flywheel 82. Spring 102 is fixed at one end in hole 104 in flywheel 82 and at its other end to pin 98 to urge the pin towards end 106 of slot 100, which allows for absorption of any shock due to mismating of the teeth. Spring 106 has one end fixed in a slot in plastic retainer 108 and its other end fixed in one of several holes 110 to provide the requisite sensitivity to reel acceleration. Screw 112 secures retainer 108 to the shaft (not shown) about which extends tube 86 to retain flywheel 82 in its axial position.

Locking means 74 may be activated in one of two ways. If tube 86 is accelerated by a sudden pull on webbing 22, the axial movement of flywheel 82 causes it to resist movement and thereby applies a force against pin 98 (via end 106 of slot 100), thereby causing lock dog 88 to rotate relative to tube 86 due to the forces acting on cam surface 90. As a result, teeth 94 engage locking ring 96 as shown in FIG. 4 to arrest rotary motion of retractor 10.

Locking means 74 is also vehicle sensitive and a deceleration or acceleration of the vehicle above a threshold level or change in attitude causes ball 76 to move, thereby lifting pawl 80 into a raised locking position. Further rotation of flywheel 82 causes teeth 84 to engage the end of pawl 80, which will lock flywheel 82 and pin 98. Further movement of tube 86 causes lock dog 88 to engage lock ring 96 as above and arrest motion of the retractor.

In any event, locking means 74 locks spool 22 from further rotary motion in the event of a vehicle emergency. As loads on webbing 22 increase due to the forces of the occupant, web clamp 26 reduces further webbing extraction that may occur due to tightening of the roll 72 of convolutions of webbing 22 on spool 20. The occupant-induced extraction forces on webbing 22 result in a lifting force on clamp 26. Springs 36, 38 oppose this lifting force (as well as lifting forces due to webbing extraction or retraction in normal use). The bias forces of springs 36, 38 are chosen to be slightly less than the retraction forces on the webbing in the normal buckled state to insure that clamp 26 is in close proximity to roll 72. The forces of springs 68, 70 are greater than the difference between normal extraction and retraction forces to insure that clamp surface 44 does not contact roll 72 when webbing is extracted during non-emergency situations. As a result, clamp 26 is kept in close proximity to roll 72 during normal operation but keeps clamp forces on roll 72 low.

As mentioned, buttons 52, 54 keep clamp surfaces 44 of clamp 26 away from roll 72 until webbing forces exceed the opposing forces resulting from springs 36, 38, 68 and 70.

When such forces exceed the opposing spring forces, clamp 26 is lifted upwards so that clamp surface 44 comes into engagement with the roll of webbing on spool 20, thereby producing a radially inward force on roll 72 which prevents further unwinding of webbing 22 from the roll. As a result, the spooling effect is eliminated or reduced.

Increased belt forces increase the clamping force of clamp 26 on roll 72 and significantly reduce the amount of webbing extraction due to web tightening on spool 20. Crash loads are ultimately transferred to tube 86 through clamp 26. When the occupant induced loads on webbing 22 are eliminated after the vehicle emergency, springs 36, 38 return clamp 26 to its original position.

The present invention thus provides a means of reducing webbing payout due to tightening of the webbing on the spool after the retractor has locked up. The invention is particularly useful in applications where the diameter of spooled webbing changes significantly during the use cycle, such as in passive seat belt systems. The buttons on the clamp bar insure that the clamp is maintained in close proximity to the roll of webbing regardless of the amount of webbing which is left on the spool. The device is compact in size and has an uncomplicated action.

It is to be understood that variations and modifications of the present invention may be made without departing from the scope thereof. It is also to be understood that the invention is not to be limited by the specific embodiments disclosed herein but only in accordance with the appended claims when read in light of the foregoing specification.

We claim:

1. A seat belt retractor comprising:
a housing;
a spool rotatably mounted in said housing;
seat belt webbing wrapped about said spool in the form of a roll of webbing and adapted to be extended therefrom and retracted thereon;
locking means in said housing actuatable to prevent rotation of said spool;
clamp means movably disposed in said housing, said clamp means having at least one clamp surface adapted to contact said roll of webbing on said spool to limit withdrawal of said webbing from said spool, said clamp means being movable towards said roll of webbing, said webbing extending from said roll of webbing on said spool about said clamp means and then out of said housing, forces acting on said webbing when said locking means is actuated resulting in movement of said clamp means towards said roll of webbing whereby said clamp surface comes into contact with said roll of webbing; and means for maintaining said clamp surface of said clamp means in close proximity to said roll of webbing on said spool regardless of the amount of webbing extended from said spool, said maintaining means comprising at least one contact member extending from said clamp surface and biased toward said roll of webbing, said contact member being in contact with said roll of webbing.

2. The retractor of claim 1 wherein said contact member comprises a bore in said clamp means, a button slidably disposed in said bore to contact said roll of webbing and a spring disposed in said bore to bias said button into contact with said roll of webbing.

3. The retractor of claim 2 wherein said clamp means comprises an elongated bar having a substantially planar clamp surface and an opposite arcuate surface about which said webbing is trained.

4. The retractor of claim 3 wherein said housing comprises a U-shaped frame having side flanges, said spool and said bar extending between said flanges, and slots in said flanges, said bar being movable in said slots whereby said clamp surface may contact said roll of webbing.

5. The retractor of claim 4, including spring means mounted between said flanges and said bar and normally resisting movement of said bar towards said roll of webbing.

6. The retractor of claim 5 wherein said locking means is actuatable to lock said spool in emergency situations.

* * * * *